United States Patent [19]
Vishlitzky

[11] Patent Number: 6,029,229
[45] Date of Patent: Feb. 22, 2000

[54] DIGITAL DATA STORAGE SUBSYSTEM INCLUDING DIRECTORY FOR EFFICIENTLY PROVIDING FORMATTING INFORMATION FOR STORED RECORDS

[75] Inventor: Natan Vishlitzky, Brookline, Mass.

[73] Assignee: EMC Corporation, Hopkinton, Mass.

[21] Appl. No.: 08/790,642

[22] Filed: Jan. 29, 1997

[51] Int. Cl.[7] .................................................. G06F 12/10
[52] U.S. Cl. .......................... 711/156; 711/205; 711/207; 711/209
[58] Field of Search ..................... 711/118, 209, 711/156, 205, 207, 216; 707/103

[56] References Cited

U.S. PATENT DOCUMENTS

| | | | |
|---|---|---|---|
| 5,421,001 | 5/1995 | Methe | 395/500 |
| 5,499,358 | 3/1996 | Nevarez | 707/101 |
| 5,535,372 | 7/1996 | Benhase et al. | 395/500 |

*Primary Examiner*—Hiep T. Nguyen
*Attorney, Agent, or Firm*—Richard A. Jordan; John M. Gunther

[57] ABSTRACT

A new digital data storage system comprises at least one storage device, a memory and a control device. The storage device retrievably stores a series of records. The memory stores at least one descriptor for describing at least one selected format attribute of the records stored by the storage device, the selected format attribute having a plurality of formatting characteristics. The descriptor includes a series of record format flags, each of which is associated one of the series of records in the storage device. Each record format flag has a first condition indicating that the selected format attribute of the associated record has a predetermined format characteristic, and a second condition indicating that the selected format attribute of the associated record has a format characteristic which is identified elsewhere in the descriptor. The control device uses the record format flags of the descriptor in connection with retrievals of ones of the records from the storage device.

27 Claims, 3 Drawing Sheets

DIGITAL DATA STORAGE SUBSYSTEM INCLUDING DIRECTORY FOR EFFICIENTLY PROVIDING FORMATTING INFORMATION FOR STORED RECORDS

FIELD OF THE INVENTION

The invention relates generally to the field of digital computer systems and more particularly to a digital data storage subsystem including a directory for efficiently providing formatting information for records stored by the digital data storage subsystem.

BACKGROUND OF THE INVENTION

In modern "enterprise" computing environments, that is, computer systems for use in an office environment in a company, a number of personal computers, workstations, mini-computers and mainframe computers, along with other devices such as large mass storage subsystems, network printers and interfaces to the public telephony system, may be interconnected to provide an integrated environment in which information may be shared among users in the company. Typically, users may be performing a variety of operations, including order receipt, manufacturing, shipping, billing, inventory control, and other operations, in which sharing of data on a real-time basis may provide a significant advantage over, for example, maintaining separate records and attempting to later reconcile them. The users may operate on their own data, which they may maintain on the computers they are using, or alternatively they may share data through the large mass storage subsystems.

One such large mass storage subsystem is described in, for example, U.S. Pat. No. 5,206,939, entitled System And Method For Disk Mapping And Data Retrieval, issued Apr. 27, 1993 to Moshe Yanai, et al (hereinafter, "the '939 patent"), U.S. patent application Ser. No. 07/893,509 filed Jun. 4, 1992, in the name of Moshe Yanai, et al., entitled "System And Method For Dynamically Controlling Cache Management," and U.S. Pat. No. 5,592,432, entitled "Cache Management System Using Time Stamping For Replacement Queue," issued Jan. 7, 1997 in the name of Natan Vishlitzky, et al., all of which are assigned to the assignee of the present invention and incorporated herein by reference. That patent and those applications generally describe an arrangement which allows data, as used by computers, organized in records, with each record being in well-known "CKD" ("count-key-data") format, to be stored in storage devices which provide a "fixed block" storage architecture. In this arrangement, a large cache is used to buffer data that is transferred from the storage devices for use by the respective computers, and, if the data has been modified, transferred back from to the storage devices for storage.

In the systems described in the aforementioned patent and patent applications, a directory table is used to provide information concerning the data that is stored in the mass storage subsystem. In one embodiment, in which the mass storage subsystem stores data on a number disk storage devices, the table includes information concerning selected characteristics of each of the CKD records stored in the mass storage subsystem, organized by device, cylinder and read/write head or track, and includes such information as record size and certain formatting characteristics. The amount of data that can be stored by individual storage devices is continually increasing over time, both in terms of the number of cylinders that each device can store and in the amount of data each track can store, and so the amount of information which such tables needs to store can become quite large.

SUMMARY OF THE INVENTION

The invention provides a new and improved digital data storage subsystem including a directory for efficiently providing formatting information for records stored by the digital data storage subsystem.

In brief summary, the new digital data storage system comprises at least one storage device, a memory and a control device. The storage device retrievably stores a series of records. The memory stores at least one descriptor for describing at least one selected format attribute of the records stored by the storage device, the selected format attribute having a plurality of formatting characteristics. The descriptor includes a series of record format flags, each of which is associated one of the series of records in the storage device. Each record format flag has a first condition indicating that the selected format attribute of the associated record has a predetermined format characteristic, and a second condition indicating that the selected format attribute of the associated record has a format characteristic which is identified elsewhere in the descriptor. The control device uses the record format flags of the descriptor in connection with retrievals of ones of the records from the storage device.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
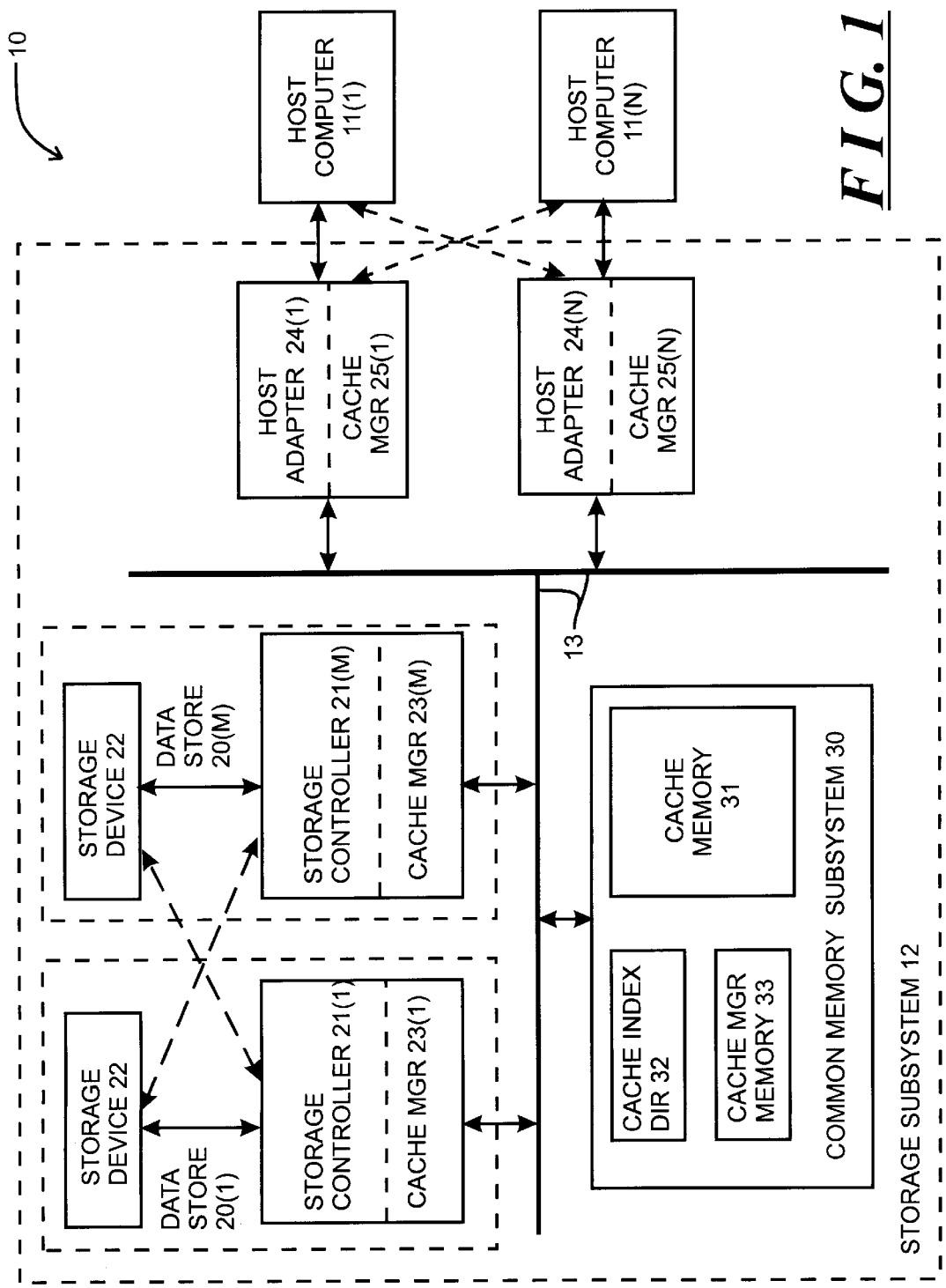
FIG. 1 is a functional block diagram of a digital computer system, including a storage subsystem constructed in accordance with the invention.

The invention will be described in connection with a digital computer system 10 depicted in functional block diagram form in FIG. 1. With reference to FIG. 1, computer system 10 includes a plurality of host computers 11(1) through 11(N) (generally identified by reference numeral 11($n$)) and a digital data storage subsystem 12 interconnected by a common bus 13. Each host computer 11($n$) may comprise, for example, a personal computer, workstation, or the like which may be used by a single operator, or a multi-user computer system which may be used by a number of operators. Each host computer 11($n$) is connected to an associated host adapter 24($n$), which, in turn, is connected to bus 13. Each host computer 11($n$) may control its associated host adapter 24($n$) to perform a retrieval operation, in which the host adapter 24($n$) initiates retrieval of computer programs and digital data (generally, "information") from the digital data storage subsystem 12 for use by the host computer 11($n$) in its processing operations. In addition, the host computer 11($n$) may control its associated host adapter 24($n$) to perform a storage operation in which the host adapter 24($n$) initiates storage of processed data in the digital data storage subsystem 12. Generally, retrieval operations and storage operations in connection with the digital data storage subsystem 12 will collectively be referred to as "access operations."

In connection with both retrieval and storage operations, the host adapter 11(n) will transfer access operation command information, together with processed data to be stored during a storage operation, over the bus 13. Access to the bus 13 is controlled by bus access control circuitry which, in one embodiment, is integrated in the respective host adapters 24(n). The bus access control circuitry arbitrates among devices connected to the bus 13 which require access to the bus 13. In controlling access to the bus 13, the bus access control circuitry may use any of a number of known bus access arbitration techniques.

The digital data storage subsystem 12 in one embodiment is generally similar to the digital data storage subsystem described in U.S. Pat. No. 5,206,939, entitled System And Method For Disk Mapping And Data Retrieval, issued Apr. 27, 1993 to Moshe Yanai, et al (hereinafter, "the '939 patent"). As shown in FIG. 1, the digital data storage subsystem 12 includes a plurality of digital data stores 20(1) through 20(M) (generally identified by reference numeral 20(m)), each of which is also connected to bus 13. Each of the data stores 20(m) stores information, including programs and data, which may be accessed by the host computers 11(n) as well as processed data provided to the digital data storage subsystem 12 by the host computers 11(n).

Each data store 20(m), in turn, includes a storage controller 21(m) and one or more storage devices generally identified by reference numeral 22. The storage devices 22 may comprise any of the conventional magnetic disk and tape storage devices, as well as optical disk storage devices and CD-ROM devices from which information maybe retrieved. Each storage controller 21(m) connects to bus 13 and controls the storage of information which it receives thereover in the storage devices connected thereto. In addition, each storage controller 21(m) controls the retrieval of information from the storage devices 22 which are connected thereto for transmission over bus 13, and in one embodiment includes bus access control circuitry for controlling access to bus 13.

The digital data storage subsystem 12 also includes a common memory subsystem 30 for caching information during an access operation and event status information providing selected status information concerning the status of the host computers 11(n) and the data stores 20(m) at certain points in their operations. The caching of event status information by the common memory subsystem 30 is described in detail in U.S. patent application Ser. No. 08/532,240 filed Sep. 22, 1995, in the name of Eli Shagam, et al., and entitled Digital Computer System Including Common Event Log For Logging Event Information Generated By A Plurality of Devices (Atty. Docket No. 95-034) assigned to the assignee of the present invention and incorporated herein by reference. The information cached by the common memory subsystem 30 during an access operation includes data provided by a host computer 11(n) to be stored on a data store 20(m) during a storage operation, as well as data provided by a data store 20(m) to be retrieved by a host computer 11(n) during a retrieval operation. The common memory subsystem 30 effectively operates as a buffer to buffer information transferred between the host computers and the data stores 20(m) during an access operation.

The common memory subsystem 30 includes a cache memory 31, a cache index directory 32 and a cache manager 33, which are generally described in U.S. patent application Ser. No. 07/893,509 filed Jun. 4, 1992, in the name of Moshe Yanai, et al., entitled "System And Method For Dynamically Controlling Cache Management," and U.S. Pat. No. 5,592,432, entitled "Cache Management System Using Time Stamping For Replacement Queue," issued Jan. 7, 1997 in the name of Natan Vishlitzky, et al. (hereinafter referred to as the "Vishlitzky patent"), both of which are assigned to the assignee of the present invention and incorporated herein by reference. The cache memory 31 operates as a buffer in connection with storage and retrieval operations, in particular buffering data received from the host computers 11(n) to be transferred to the storage devices for storage, and buffering data received from the data stores 20(m) to be transferred to the host computers 11(n) for processing.

Figure 2:
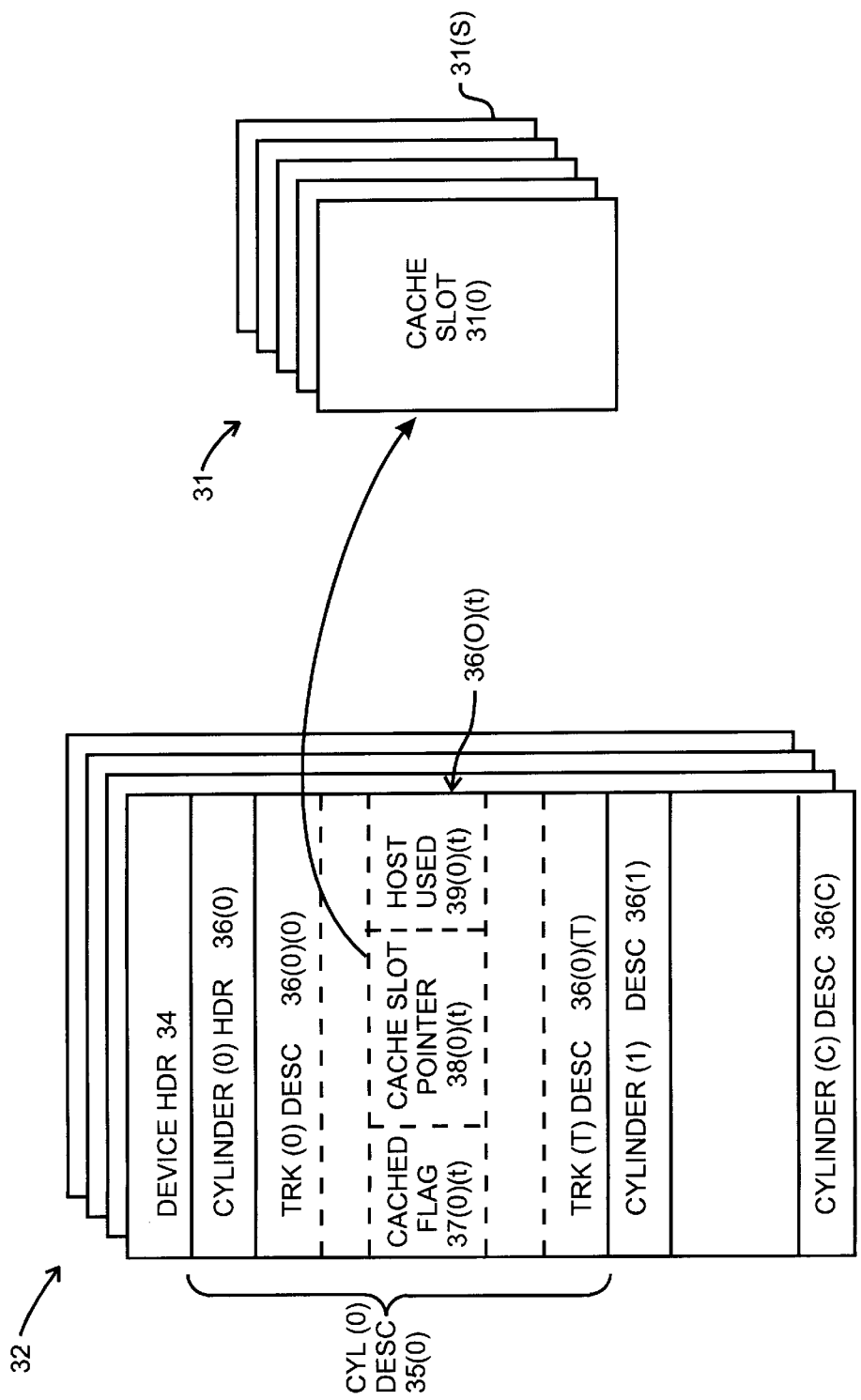
FIG. 2 depicts the organization of a cache memory and cache index directory useful in understanding the operation of the storage subsystem depicted in FIG. 1.

The cache memory 31 and cache index directory 32 will generally be described in connection with FIG. 2. With reference to FIG. 2, the cache memory 31 includes a series of storage locations, which are organized in a series of cache slots 31(0) through 31(S) (generally identified by reference numeral 31(s)). The storage locations are, in turn, identified by a series of addresses, with the starting address of a cache slot being identified by a base address. The cache slots 31(s), in turn, operate as the cache memory's buffer as described above.

The cache index directory 32 operates as an index for the cache slots 31(s) in the cache memory 31. The cache index directory 32 includes a plurality of cache index tables 32(0) through 32(D) generally identified by reference numeral 32(d)), each of which is associated with one of the storage devices 22 in the storage subsystem 12. Each cache index table 32(d) includes a device header field 34, which provides, for example, selected identification and status information for the device 22 associated with the cache index table 32(d). In addition, each cache index table 32(d) includes a plurality of cylinder descriptors 35(1) through 35(C) (generally identified by reference numeral 35(c)) each of which is associated with one of the cylinders in the storage device 22 that is associated with the cache index table 32(d). Each cylinder descriptor 35(c), in turn, includes a cylinder header 36(c), which provides, for example, selected identification and status information for the cylinder associated with the cylinder descriptor 35(c).

In addition, each cylinder descriptor 35(c) includes a plurality of track descriptors 36(c)(0) through 36(c)(T) (generally identified by reference numeral 35(t)), each of which is associated with one of the tracks in the cylinder 35(c). Each track descriptor 35(c)(t), in turn, includes information for the associated track of the storage device 22, including whether a copy of the data stored on the track is cached in the cache memory 31, and, if so, the identification of the cache slot 31(s) in which the data is cached. In one embodiment, each track descriptor 35(c)(t) includes a cached flag 37(c)(t) and a cache slot pointer 38(c)(t). The cached flag 37(c)(t), if set, indicates that the data on the track associated with the track is cached in a cache slot 31(s), and the cache slot pointer 38(s)(t) identifies the particular cache slot in which the data is cached. In addition, each track descriptor 35(c)(t) includes a used flag 39(c)(t) which may be used to indicate whether the data, after being stored in the cache slot identified by the cache slot pointer 38(c)(t), has been used by the host computer 11(n) during a retrieval operation. This "host used" flag may be used to determine whether the cache slot may be re-used for another access operation.

Each of the host adapters 24(n) and each of the device controllers 21(m) includes a cache manager 16(n) and 23(m), respectively, to access to the cache memory 31, cache index directory 32 and cache manager memory 33. The particular operations performed during an access operation will depend on a number of factors, including the access operation to be performed, whether or not the data from the particular track to be accessed is cached in the cache memory 31, and whether or not the data contained in a cache slot 31(s) has been modified or updated by a host adapter's cache manager 16(n) during a storage operation. As described in the aforementioned Vishlitzky patent, the host adapters 24(n) typically perform storage and retrieval operations in connection with data in the cache memory 31, and the device controllers 21(m) perform "staging" and "de-staging" operations to transfer data in the storage devices 22 to the cache memory 31 for buffering (the staging operations) and to transfer data from the cache memory 31 to the storage devices 22 for storage (the de-staging operations). In performing the staging and de-staging operations, the device controllers 21(m) generally transfer data to and from the cache memory 31 in units of a track, that is, they will during a staging operation transfer all of the data in a track from a storage device 22 to a cache slot 31(s) in the cache memory 31, and during a de-staging operation copy all of the data in a slot in the cache memory 31 to the track of the storage device 22 from which it was originally staged.

The cache manager memory 33 maintains a number of work lists which are used to control operations by the host adapters 24(n) and storage controllers 21(m) during an access operation. In particular, the cache manager memory 33 includes a cache slot replacement list, a pending write list and various lists which the host adapters 24(n) and storage controllers 21(m) use to communicate to coordinate staging operations (not shown). It will be appreciated that the various lists maintained by the cache manager memory 33 may comprise any of a number of convenient forms, including queues, trees, stacks or the like. The cache slot replacement list is used to control re-use of cache slots during staging operations in accordance with a convenient cache-slot re-use methodology. During a staging operation, the storage controller's cache manager 23(m) uses the cache slot replacement list to select a cache slot 31(s) into which it will load the data retrieved from a storage device. (The aforementioned Vishlitzky patent describes a modified least-recently-used cache-slot re-use methodology used in one embodiment of the invention). The pending write list is used to identify cache slots 31(s) which contain updated data, which has not been written to a storage device. During de-staging operations, the storage controllers' cache managers 23(m) will use the write pending list to identify cache slots to be written to a storage device 22. Preferably, the cache slots 31(s) which are identified in the pending write list will not also be listed in the cache slot replacement list, so that cache slots 31(s) which contain updated data will not be used until the data has not been written to a storage device through a de-staging operation.

The staging operation coordination communication lists include a plurality of stage request lists and a plurality of stage completion lists, with one stage request list being associated with each data store 20(m) and one stage completion list being associated with each host computer 11(n). The host adapters' cache managers 16(m) use the stage request lists to store stage requests to be performed by the respective data stores 20(m), and the data stores' cache managers 23(n) use the stage completion lists to store stage completion messages to indicate to the respective host adapters' cache managers 16(m) that the stage requests have been completed.

Generally, a host adapter 24(n), during a retrieval operation, attempts to retrieve the data from the cache memory 31. However, if the data is not in the cache memory 31, it will enable the device controller 21(m) which controls the storage device 22 that contains the data to be retrieved to "stage" the track which contains the data to be retrieved, that is, to transfer all of the data in the track which contains the data to be retrieved into a slot in the cache memory 31. After the data to be retrieved is in a slot in the cache memory 31, the host adapter 24(n) will retrieve the data from the slot. Similarly, during a storage operation, the host adapter 24(n) will determine whether the particular track into which the data is to be written is in a slot in the cache memory 31 and if so will store the data in the slot. However, if the data is not in the cache memory 31, the host adapter 24(n) will enable the cache manager 23(m) and storage controller 21(m) which controls the storage device 22 that contains the track whose data is to be updated to perform a staging operation in connection with the track, thereby to transfer the data in the track into a slot in the cache memory 31. After the data from the track has been copied into the cache memory 31, the host adapter 24(n) will update the data in the track.

The storage controller 21(m) generally attempts to perform a staging operation in connection with an empty slot in the cache memory 31. However, if the storage controller 21(m) may find that all of the cache slots in the cache memory 31 are filled, it will in any case select one of the slots to be used with the staging operation. Before transferring the data from the track to the selected cache slot, it will determine whether the data in the slot has been updated by a storage operation, and if so copy the data to the storage device 22 in a de-staging operation, and thereafter perform a staging operation to copy the data from the storage device to the selected cache slot. It will be appreciated that the storage controller 21(m) need only perform a de-staging operation in connection with a cache slot if the data in the cache slot has been updated, since if the data in the cache slot not been updated before the slot is re-used (which may occur if the host adapter 24(n) has only performed retrieval operations therewith), the data in the cache slot corresponds to the data in the storage device 22.

More specifically, as described in the aforementioned Vishlitzky patent, during a retrieval operation, the cache manager 16(n) of the initiating host adapter 24(n) will initially access the cache index table 32(d) in the cache index directory 32 associated with the storage device 22 in which the data to be retrieved is stored, in particular accessing the track descriptor 36(c)(t) of the cylinder descriptor 36(c) to determine, from the condition of the cached flag 37(c)(t), whether the data from the track is cached in a cache slot 31(s) in the cache memory. If the cached flag 37(c)(t) indicates that data from the track is cached in a cache slot 31(s), the cache manager 16(n) uses the cache slot pointer 38(c)(t) to identify the particular cache slot 31(s) in which the data is cached and retrieves the required data from the cache slot 31(s).

On the other hand, if the cache manager 16(n) determines from the cached flag 37(c)(t) that the data from the track is not cached in a cache slot 31(s), it will generate a stage request to enable the storage controller 21(m) for the storage device 22 which maintains the data to be retrieved, load the stage request in the stage request queue for the data store 21(m) and notify the storage controller 21(m) that a stage request had been loaded in the stage request queue. At some point after receiving the notification, the storage controller 21(m) will retrieve the stage request and perform a staging operation in response thereto. In performing the staging operation, the storage controller 21(m) will retrieve the data from the requested track, use the above-described cache slot replacement list to select a cache slot 31(s), load the data into cache slot 31(s) and update the track descriptor 36(c)(t) in the cache index table 32(d) associated with the storage device 22 to indicate that the data from the track is in the cache slot 31(s), in particular setting the cached flag 37(c)(t) and loading a pointer to the cache slot in the cache slot pointer 38(c)(t).

After the storage controller 21(m) has completed the staging operation, it will load a staging completed message in the stage completion list in the cache manager memory 33 associated with the host computer 11(n) which issued the staging request, and notify the host computer's cache manager 16(n) that a stage completed message has been loaded therein. At some point after receiving the notification, the host computer's cache manager 16(n) can repeat the operations performed in connection with the retrieval request as described above, in particular accessing the cache index table 32(d) in the cache index directory 32 associated with the storage device 22 in which the data to be retrieved is stored, in particular accessing the track descriptor 36(c)(t) of the cylinder descriptor 36(c) to determine, from the condition of the cached flag 37(c)(t), whether the data from the track is cached in a cache slot 31(s) in the cache memory and, if so, use the cache slot pointer 38(c)(t) to identify the particular cache slot 31(s) in which the data is cached and retrieve the required data from the cache slot 31(s). Since at this point the cached flag 37(c)(t) should indicate that the data from the track is cached in a cache slot 31(s), the host adapter's cache manager 16(n) should be able to complete the retrieval operation.

Similar operations occur during a storage operation, in which data in a particular track is updated, with the additional operation of removing the identification of the cache slot 31(s) containing data to be updated from the replacement list and loading it into the pending write list. During a storage operation, the cache manager 16(n) of the initiating host adapter 24(n) will initially access the cache index table 32(d) in the cache index directory 32 associated with the storage device 22 in which the data to be updated is stored, in particular accessing the track descriptor 36(c)(t) of the cylinder descriptor 36(c) to determine, from the condition of the cached flag 37(c)(t), whether the data from the track is cached in a cache slot 31(s) in the cache memory. If the cached flag 37(c)(t) indicates that data from the track is cached in a cache slot 31(s), the cache manager 16(n) uses the cache slot pointer 38(c)(t) to identify the particular cache slot 31(s) in which the data is cached and loads the update data into the cache slot 31(s). In addition, the host adapter's cache manager 16(n) will remove the identification of the selected cache slot 31(s) from the replacement list to the pending write list so that the cache slot 31(s) will not be re-used until a de-staging operation has been performed in connection with the cache slot 31(s).

On the other hand, if the cache manager 16(n) determines from the cached flag 37(c)(t) that the data from the track is not cached in a cache slot 31(s), it will generate a stage request to enable the storage controller 21(m) for the storage device 22 which maintains the data to be retrieved, load the stage request in the stage request queue for the data store 21(m) and notify the storage controller 21(m) that a stage request had been loaded in the stage request queue. At some point after receiving the notification, the storage controller 21(m) will retrieve the stage request and perform a staging operation in response thereto. In performing the staging operation, the storage controller 21(m) will retrieve the data from the requested track, select a cache slot 31(s), load the data into cache slot 31(s) and update the track descriptor 36(c)(t) in the cache index table 32(d) associated with the storage device 22 to indicate that the data from the track is in the cache slot 31(s), in particular setting the cached flag 37(c)(t) and loading a pointer to the cache slot in the cache slot pointer 38(c)(t).

After the storage controller 21(m) has completed the staging operation, it will load a staging completed message in the stage completion queue in the cache manager memory 33 associated with the host computer 11(n) which issued the staging request, and notify the cache manager 16(n) that a stage completed message has been loaded therein. At some point after receiving the notification, the cache manager 16(n) can repeat the operations performed in connection with the retrieval request as described above, in particular accessing the cache index table 32(d) in the cache index directory 32 associated with the storage device 22 in which the data to be retrieved is stored, in particular accessing the track descriptor 36(c)(t) of the cylinder descriptor 36(c) to determine, from the condition of the cached flag 37(c)(t), whether the data from the track is cached in a cache slot 31(s) in the cache memory and, if so, use the cache slot pointer 38(c)(t) to identify the particular cache slot 31(s) in which the data is cached and retrieve the required data from the cache slog 31(s). Since at this point the cached flag 37(c)(t) should indicate that the data from the tack is cached in a cache slot 31(s), the cache manager 16(n) should be able to complete the storage operation as described above.

As described above, the data stores' cache managers 23(m) also perform de-staging operations using the pending write list to identify cache slots 31(s) which contain updated data to be written back to the original storage device 22 and track whose data was cached in the respective cache slots 31(s). When a cache slot 31(s) is de-staged, since at that point the data in the cache slot 31(s) corresponds to the data on the respective storage device 22, the data store's cache manager 23(m) which performs the de-staging operation will remove the cache slot's identification from the pending write list and return it to the replacement list so that the cache slot 31(s) can be removed. It will be appreciated, however, that a host computer's cache manager 16(n) may perform a number of retrieval operations and/or storage operations in connection with data in the same cache slot 31(s) after the data in the track cached in the slot has been staged and before it can be de-staged, and so data in a cache slot 31(s) can be updated a number of times before it is de-staged. In addition, it will be appreciated that after a cache slot 31(s) has been de-staged, it may also be updated during a storage operation before the cache slot 31(s) is re-used during a staging operation. When that occurs however, since, as described above, the host computer's cache manager 16(m) removes the cache slot's identification from the replacement list and placed it on the write pending list as part of the storage operation, the cache slot 31(s) will be subject to another de-staging operation before it can be re-used. Thus, a particular cache slot 31(s) may be subject to de-staging a number of times with data cached for the same storage device 22, cylinder and track, without being reused.

Figure 3:
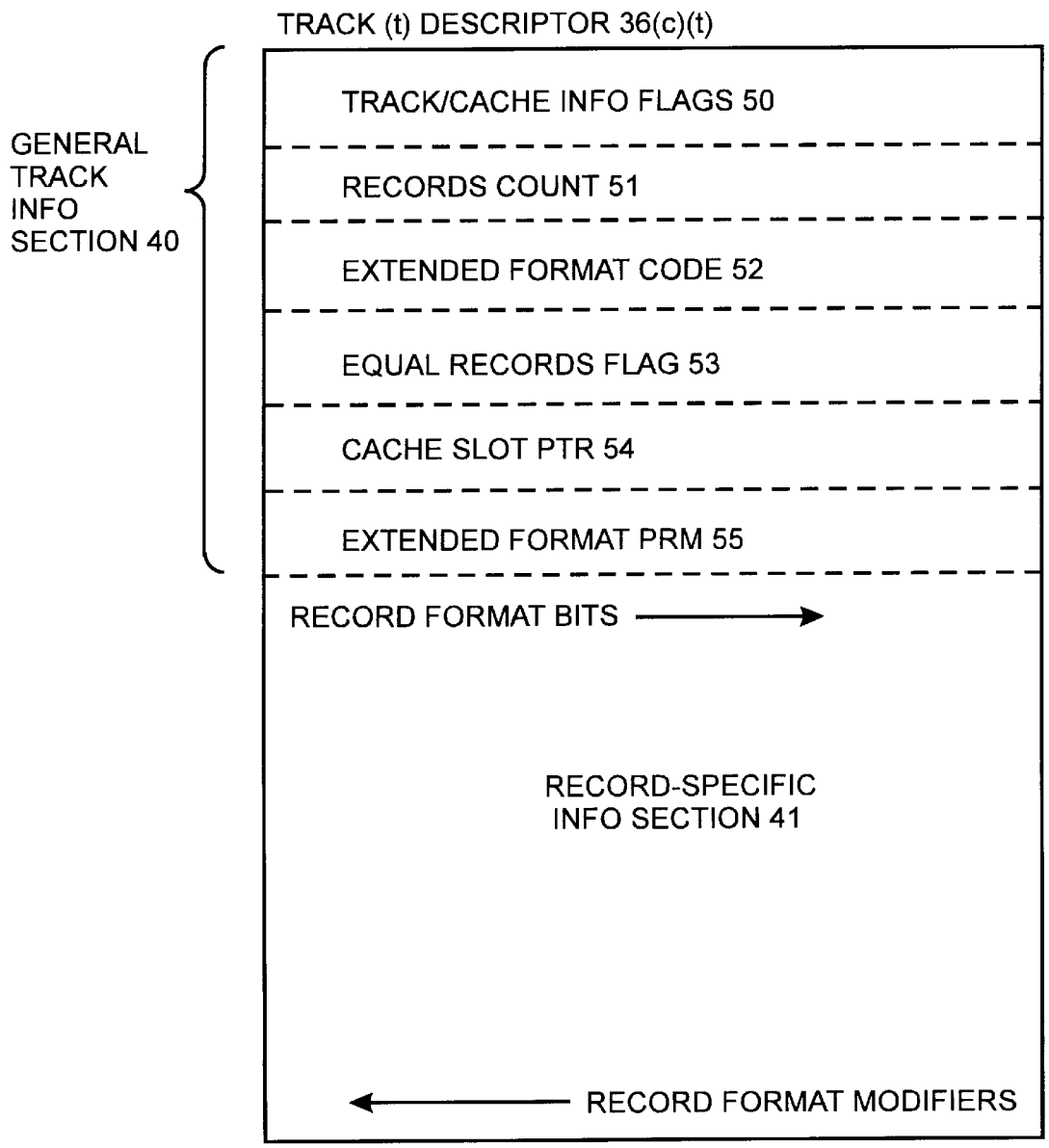
FIG. 3 depicts the structure of a descriptor, useful in the cache memory depicted in FIG. 2, the descriptor providing formatting information for information stored by the storage subsystem.

The invention provides an arrangement for compactly providing track descriptor information in the respective track descriptors 36(c)(t) (FIG. 2), to efficiently accommodate use of storage devices 22 which can store relatively high-density data and reduce the amount of information which would otherwise need to be stored. FIG. 3 depicts the structure of a track descriptor, identified by reference numeral 36(c)(t), for use in connection with one embodiment of the invention.

With reference to FIG. 3, the track descriptor 36(c)(t) includes a general track information section 40 and a record specific information section 41. The general track information section 40 includes information about the track, including such information as whether the track is cached in the cache memory 31 and, if so, a pointer to the cache slot 31(s) in which the track is cached. In addition, the general track information section 40 indicates the number of records in the track, and provides some supplemental formatting information for the records in the track. The record specific information section 41, on the other hand, contains record-specific basic formatting information for the respective records in the track.

More specifically, the general track information section 40 includes a number of flags and fields as shown in FIG. 3, including a track/cache information flags field 50, a records count field 51, an extended format code field 52, an equal records flag 53, a cache slot pointer field 54 and an extended format parameter field 55. The track/cache information flags field 50 includes several flags (not separately shown), including a track in cache flag, (which correspond to the cached flag 37(c)(t) described above in connection with FIG. 2) a prefetched track flag, a track write pending flag, and a permanently cached track flag, all of which are used in managing caching in connection with the track. The track in cache flag, if set, indicates that the track is currently cached in the cache memory 31; when that occurs, the cache slot pointer field 54 (which corresponds to the cache slot pointer 38(c)(t) described above in connection with FIG. 2) contains a pointer that identifies the cache slot 31(s) in which the track is cached. The prefetched track flag, if set, indicates that the data store's cache manager 23(m) prefetched the track and loaded it in the cache memory 31 before it was requested to do so by a host adapter's cache manager 25(n). Generally, a cache manager 23(m) may prefetch a particular track if a host adapter's cache manager 25(n) initiates a series of staging operations for a series of preceding tracks, which can indicate that the program being processed by the associated host computer 11(n) will likely also request that the particular track be staged.

The permanently cached track flag of the track/cache information flags field 50 is set if the track is to be permanently cached in a cache slot 31(s) and not to be overwritten. A host computer's cache manager 25(n) may request that a track be permanently cached if the program being processed by the associated host computer is expected to access the records in the track frequently.

The track write pending flag is used to indicate that the information in the track has been updated by a host computer 11(n) and needs to be de-staged by a data store 20(m). While the write pending flag is set, to indicate that a de-staging operation is to be performed, the cache slot 31(s) in which the track is cached will not be used for another track until the de-staging operation has been completed. It will be appreciated that, if the permanently cached track flag is also set, after the de-staging operation the cache slot 31(s) will not be used for another track, but instead the track will remain in the cache slot 31(s) as long as the permanently cached track flag is set.

The records count field 51 of the track descriptor 36(c)(t) stores a records count value that identifies the number of CKD records that are stored in the track associated with the track descriptor 36(c)(t).

The equal records flag 53 of the track descriptor 36(c)(t) is used to indicate whether all of the CKD records stored on the track have the same format. Generally, the equal records flag 53, when set, indicates that the count ("C") fields of all of the records have the same length, the key ("K") fields of all of the records have the same length and the data ("D") fields of all of the records also have the same length. In one particular embodiment, each of the tracks has a first CKD record that has a predetermined format and if the equal records flag 53 is set, all of the records in the track will have the same format as the first CKD record in the track.

The extended format code field 52 and the extended format parameter field 55 of the general track information section 40 and the entire record-specific information section 41 of the track descriptor 36(c)(t) are used to provide formatting information for each of the CKD records in the track associated with the track descriptor 36(c)(t). As shown in FIG. 3, the record-specific information section includes two types of record-specific format information, including (i) a series of record format bits which extend from the beginning of the record-specific information section 41 and proceeding toward the end of the section 41, and (ii) a series of record format modifiers which extend from the end of the record-specific information section 41 and proceeding toward the beginning of the section 41.

Each of the series of CKD records in the track is associated with one of the series of record format bits, so that the "r-th" record is associated with the "r-th" bit; thus, if the track contains "R" records, the first "R" bits of the record-specific information section 41 will be used for the record format bits.

Each of the record format bits essentially operates as a flag that has a two conditions, namely, a clear condition and a set condition. When the record format bit has a clear condition, the record associated with the bit has a predetermined format, in particular that it has count, key and data sections each of which have predetermined respective sizes and a record identifier value which is one greater than the record identifier of the preceding record.

On the other hand, when the record format bit has a set condition, the record associated with the bit has a format that differs from the predetermined format, and the values in the extended format code field 52 and extended format parameter field 55 are used to provide information regarding the difference between the format of the record associated with the bit and the predetermined format. The manner in which the record's format differs from the predetermined format, that is, the record's extended format, is indicated by the value of an extended format code in the extended format code field 52. The extent of the difference between the record's format and the predetermined format is indicated by the value of a parameter in the extended format parameter field 55 and the values of the record format modifier in the record-specific information section 41.

A plurality of types of extended formats are selectively used in one embodiment of the invention. The various types of extended formats which may be selected for use in connection with the system 10 maybe efficiently determined by a system designer in connection with examination of various patterns of record structures which are used in particular installations of the system 10, which, in turn, can effectively depend on various types of data processing operations which are carried out in such an installation. For example, in many cases, CKD records on a track are of a single uniform record length, or of two diverse record lengths with record lengths of the successive records alternating between the two lengths. In addition, in many cases CKD records on a track have record identifiers of sequential values, or values which change according to a pattern. One embodiment of the invention makes use of a number of values for the extended format code, each associated with a particular type of extended format.

More specifically, the specific extended formats used in one embodiment of the invention are primarily directed to record length and record identifier value. More particularly, that embodiment provides two basic record length extended formats. For one of the basic record length extended formats, if the record format bit in the record-specific information section 41 that is associated with a particular record is set, and if the value of the extended format code in the field 52 identifies one record length extended format, the actual length of the record will be indicated by one of the record format modifiers in the record-specific information section 41. Length information will be provided for each of the records for which the record format bit is set, so that, if record "$r_1$" is the first record for which the record format bit is set, the first record format modifier in the series of record format modifiers in the record-specific information section 41 will comprise length information for the record "$r_1$." Similarly, if the record "$r_x$" is the "x-th" record for which the record format bit is set, the "x-th" record format modifier in the series of record format modifiers in the record-specific information section 41 will comprise length information for the record "$r_x$." As indicated above, the series of record format modifiers proceeds from the end of the record-specific information section, and so the first record format modifier in the series is actually at the end of the record-specific information section 41, and the "x-th" record format modifier is the "x-th" modifier from the end of the record-specific information section 41.

In that same embodiment, for the second basic record length extended format, if the record format bit in the record-specific information section 41 that is associated with a particular record is set, and if the value of the extended format code in field 52 identifies the second record length extended format, if:

(i) the record is the third, fifth, seventh, . . . , (generally, an odd-numbered) record in the track, the length of the record is the same as the first record on the track, but (ii) the record is the fourth, sixth, eighth, . . . , (generally, an even-numbered) record in the track, the length of the record is the same as the second record on the track.

This type of extended record format accommodates use of tracks in which the record length alternates between two diverse record lengths.

Other types extended formats used in one embodiment of the invention relate to the pattern by which record identifier values for the records in the respective track increment or decrement from record to record. In one embodiment, two types of extended formats are provided, for both of which record identifier value pattern information is provided by the value in the extended format parameter field 55. With one type of record identifier value pattern extended format, if the value of the extended format code in the field 52 identifies the record identifier value extended format type, and if the record format bit in the record-specific information section 41 that is associated with a particular record is set, the pattern of record identifier values for such records will be as identified in the extended format parameter field 55. In particular, if the "r-th" record format bit is set, the record identifier value for the record will correspond to the record identifier value for the "r-1st" plus the value contained in the extended format parameter field 55. In this case, if, for example, all of the records in the track are associated with record format bits which are set, the record identifier values of all of the records will increase by an amount corresponding to the value in the extended format parameter field 55.

On the other hand, for the second type of record identifier value pattern extended format, if the value, two values are provided in the extended format parameter field 55, one of which is used in connection with determining the record identifier value for the third, fifth, seventh, . . . (generally, an odd-numbered) record, and the other of which is used in connection with determining the record identifier value for record is the fourth, sixth, eighth, . . . , (generally, an even-numbered) record. In particular, if the record format bit in the record-specific information section 41 that is associated with a particular record is set, and if the value of the extended format code in field 52 identifies the second record identifier value extended format, if:

(i) the record is an odd-numbered record in the track, the record identifier value associated with the record corresponds to the record identifier value of the preceding record on the track, incremented by the record identifier incrementation value used for the odd-numbered records, but (ii) the record is an even-numbered record in the track, the record identifier value associated with the record corresponds to the record identifier value of the preceding record on the track, incremented by the record identifier incrementation value used for the even-numbered records.

This type of extended record format accommodates use of tracks in which the record identifier values change using alternating incrementation values.

Generally, in that same embodiment, if the extended format code field 52 identifies an extended format of one of the record length types, the record identifier values for the series of records on the track increment according to a predetermined record identifier value incrementation pattern, generally incrementing by the value "one" for successive records. Contrariwise, if the extended format code field 52 identifies an extended format of one of the record identifier types, the record lengths follow a predetermined record length pattern, generally corresponding to the same length value. In addition to the predetermined types of extended formats, one embodiment is also provided with a miscellaneous extended format, which is identified by yet another extended format code value which can be provided by the extended format code field 52.

For the miscellaneous extended format, if the record format bit in the record-specific information section 41 that is associated with a particular record is set, and if the value of the extended format code in the field 52 identifies the miscellaneous extended format, one of the record format modifiers in the record-specific information section 41 will provide formatting information for the record. Formatting information will be provided for each of the records for which the record format bit is set, so that, if record "$r_1$" is the first record for which the record format bit is set, the first record format modifier in the series of record format modifiers in the record-specific information section 41 will comprise length information for the record "$r_1$." Similarly, if the record "$r_x$" is the "x-th" record for which the record format bit is set, the "x-th" record format modifier in the series of record format modifiers in the record-specific information section 41 will comprise format information for the record "$r_x$." It will be appreciated that the formatting information represented by the diverse record format modifiers in record-specific information section 41 may differ as among the various records for which record format modifiers are provided. As indicated above, the series of record format modifiers proceeds from the end of the record-specific information section 41, and so the first record format modifier in the series is actually at the end of the record-specific information section 41, and the "x-th" record format modifier is the "x-th" modifier from the end of the record-specific information section 41.

The formatting information provided by the record-specific information section 41, extended format code 52, and extended format parameter 55 in the track descriptor 36(c)(t) associated with a track can be used by a host adapter's cache manager 25(n) to identify the series of records in the track after the track has been cached in the cache memory 31 during a staging operation. In particular, if the cache manager 25(n) is locating a record associated with a record identifier having a particular record identifier value, it can use the record identifier value information in the track descriptor 36(c)(t) to sequence through the record identifier values for the series of records on the track to identify which record in the track is associated with the required record identifier value. After identifying the record associated with the required record identifier value, it can use the length information for successive records from the descriptor 36(c)(t) to generate an offset into the cache slot 31(s) to locate the beginning and end of the record. Similarly, if a storage controller's cache manager 24(m) stages and de-stages records on a record-by-record basis, in which individual records from a track are stored at locations offset from the beginning of the cache slot 31(s) corresponding to their offsets from the beginning of the respective track, it (that is, the storage controller's cache manager 24(m)) will use the record-specific information section 41, extended format code 52, and extended format parameter 55 in the track descriptor 36(c)(t) associated with the track to both locate the respective record on the track and to determine the location for the record in the cache slot 31(s).

The invention provides a number of advantages. In particular, it provides a digital data storage subsystem in which formatting information for the various tracks can be efficiently stored, to efficiently accommodate formatting information for records stored on storage devices 22 whose tracks can each store large amounts of information in large numbers of records, without requiring correspondingly large track descriptors 36(c)(t). As described above, in many applications, the formatting for records on a track is relatively uniform, and the invention accommodates providing, in the record format bits, an indication as to whether the record formats correspond to a predetermined format using only one bit per record. If the formats of particular records on a track do not conform to the predetermined format, the formats for those records will be indicated elsewhere in the descriptor 36(c)(t).

It will be appreciated that a number of modifications may be made to the digital data storage subsystem as described above in connection with FIGS. 1 through 4. For example, although the storage subsystem 12 has been described as being connected to a plurality of host computers 11(n), it will be appreciated that the storage subsystem may be used only in connection with a single host computer 11(n). In addition, although the storage subsystem 12 has been described as including a plurality of data stores 20(m) and a plurality of storage devices 22, it will be appreciated that the storage subsystem 12 may be provided with a single data store and a single storage device.

It will be appreciated that a system in accordance with the invention can be constructed in whole or in part from special purpose hardware or a general purpose computer system, or any combination thereof, any portion of which may be controlled by a suitable program.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A digital data storage system comprising:
   A. at least one storage device for retrievably storing a series of records;
   B. a memory for storing a descriptor for describing at least one selected format attribute of the records stored in said storage device, the selected format attribute having a plurality of formatting characteristics, the descriptor including a series of record format flags each associated one of the series of records in the storage device, each record format flag having a first condition indicating that the selected format attribute of the associated record has a predetermined format characteristic, and a second condition indicating that the selected format attribute of the associated record has a format characteristic which is identified elsewhere in the descriptor; and
   C. a control device for using the record format flags of said descriptor in connection with retrievals of ones of said records from said storage device.

2. A system as defined in claim 1 in which said descriptor can describe one of a plurality of format attributes of records stored by said storage device, said descriptor further including an extended format code having one of a plurality of values to identify the one of the plurality of format attributes indicated when said record format flag has said second condition.

3. A system as defined in claim 2 in which:
   A. each record has an associated record length;
   B. one of said format attributes is associated with record length, such that,
      i. if the record format flag associated with one of said records has the first condition, the one of said records has a record length corresponding to the record length of the previous record in the series, or
      ii. if the record format flag associated with one of said records has the second condition, the one of said records has a record length determined in relation to information elsewhere in the descriptor.

4. A system as defined in claim 1 in which the descriptor has a body portion having a start end and a rear end, and in which (i) the series of record format flags associated with the series of records are in serial order from the start end and (ii) format attribute difference information for successive records whose associated record format flags have the second condition are in reverse serial order from the rear end.

5. A system as defined in claim 1 in which the storage device stores records organized in a plurality of tracks, each track comprising a series of said records, the memory storing a plurality of descriptors each associated with one of said tracks, each descriptor including ones of said record format flags associated with the ones of said records in the track associated therewith.

6. A system as defined in claim 5 in which the predetermined format characteristic can differ among said tracks.

7. A system as defined in claim 5 in which the selected format attribute can differ among said tracks.

8. A system as defined in claim 5 in which said control device includes a cache for caching records retrieved from selected ones of said tracks, the descriptor associated with each track further including predetermined cache information for said track.

9. A system as defined in claim 8 in which the predetermined cache information for at least one of said track descriptors includes a cached flag having a cached condition indicating that the track associated with said at least one of said track descriptors is in said cache, and another condition indicating that the track associated with said at least one of said track descriptors is not in said cache.

10. A system as defined in claim 9 in which cache includes a plurality of cache slots, the predetermined cache information for said at least one of said track descriptors further including a cache slot pointer which points to the one of said plurality of cache slots in which the track is cached if the cached flag has said cached condition.

11. A memory including a plurality of storage locations each for storing a descriptor for describing at least one selected format attribute of a respective one of a plurality of records stored in a storage device, the selected format attribute having a plurality of formatting characteristics, the descriptor including a series of record format flags each associated one of the series of records in the storage device, each record format flag having a first condition indicating that the selected format attribute of the associated record has a predetermined format characteristic, and a second condition indicating that the selected format attribute of the associated record has a format characteristic which is identified elsewhere in the descriptor.

12. A memory as defined in claim 1 in which said descriptor can describe one of a plurality of format attributes of records stored by said storage device, said descriptor further including an extended format code having one of a plurality of values to identify the one of the plurality of format attributes indicated when said record format flag has said second condition.

13. A memory as defined in claim 12 in which if each record has an associated record length one of said format attributes is associated with record length, such that,
   A. if the record format flag associated with one of said records has the first condition, the one of said records has a record length corresponding to the record length of the previous record in the series, or
   B. if the record format flag associated with one of said records has the second condition, the one of said records has a record length determined in relation to information elsewhere in the descriptor.

14. A memory as defined in claim 11 in which the descriptor has a body portion having a start end and a rear end, and in which (i) the series of record format flags associated with the series of records are in serial order from the start end and (ii) format attribute difference information for successive records whose associated record format flags have the second condition are in reverse serial order from the rear end.

15. A memory as defined in claim 11, the storage device storing records organized in a plurality of tracks, each track comprising a series of said records, the memory storing a plurality of descriptors each associated with one of said tracks, each descriptor including ones of said record format flags associated with the ones of said records in the track associated therewith.

16. A memory as defined in claim 15 in which the predetermined format characteristic as set forth in said descriptors can differ among descriptors associated with said respective tracks.

17. A memory as defined in claim 15 in which the selected format attribute as set forth in said descriptors can differ among descriptors associated with said respective tracks.

18. A method of operating a digital data storage system comprising at least one storage device for retrievably storing a series of records comprising the steps of
   A. storing a descriptor for describing at least one selected format attribute of the records stored in said storage device, the selected format attribute having a plurality of formatting characteristics, the descriptor including a series of record format flags each associated one of the series of records in the storage device, each record format flag having a first condition indicating that the selected format attribute of the associated record has a predetermined format characteristic, and a second condition indicating that the selected format attribute of the associated record has a format characteristic which is identified elsewhere in the descriptor; and
   B. using the record format flags of said descriptor in connection with retrievals of ones of said records from said storage device.

19. A method as defined in claim 18 in which said descriptor can describe one of a plurality of format attributes of records stored by said storage device, said descriptor further including an extended format code having one of a plurality of values to identify the one of the plurality of format attributes indicated when said record format flag has said second condition.

20. A method as defined in claim 18 in which:
   A. each record has an associated record length;
   B. one of said format attributes is associated with record length, such that,
      i. if the record format flag associated with one of said records has the first condition, the one of said records has a record length corresponding to the record length of the previous record in the series, or
      ii. if the record format flag associated with one of said records has the second condition, the one of said records has a record length determined in relation to information elsewhere in the descriptor.

21. A method as defined in claim 18 in which the descriptor has a body portion having a start end and a rear end, and in which (i) the series of record format flags associated with the series of records are in serial order from the start end and (ii) format attribute difference information for successive records whose associated record format flags have the second condition are in reverse serial order from the rear end.

22. A method as defined in claim 18 in which the storage device stores records organized in a plurality of tracks, each track comprising a series of said records, the memory storing a plurality of descriptors each associated with one of said tracks, each descriptor including ones of said record format flags associated with the ones of said records in the track associated therewith.

23. A method as defined in claim 22 in which the predetermined format characteristic can differ among said tracks.

24. A method as defined in claim 22 in which the selected format attribute can differ among said tracks.

25. A method as defined in claim 22 in which the step of using the record format flags of said descriptor in connection with retrievals of ones of said records from said storage device, includes the step of caching said records, the descriptor associated with each track further including predetermined cache information for said track.

26. A method as defined in claim 25 in which the predetermined cache information for at least one of said track descriptors includes a cached flag having a cached condition indicating that the track associated with said at least one of said track descriptors is cached, and another condition indicating that the track associated with said at least one of said track descriptors is not cached.

27. A method as defined in claim 26 in which said caching step includes the step of caching a respective one of said records in one of a plurality of cache slots, the predetermined cache information for said at least one of said track descriptors further including a cache slot pointer which points to the one of said plurality of cache slots in which the track is cached if the cached flag has said cached condition.

* * * * *